May 9, 1950     G. O. R. LINDGREN     2,506,724

EXPANSION VALVE

Filed Oct. 2, 1945

INVENTOR.
GEORGE O. R. LINDGREN
BY Richey & Watts
ATTORNEYS

Patented May 9, 1950

2,506,724

UNITED STATES PATENT OFFICE 2,506,724

EXPANSION VALVE

George O. R. Lindgren, Willoughby, Ohio, assignor to The Weatherhead Company, Cleveland, Ohio, a corporation of Ohio Application October 2, 1945, Serial No. 619,734

6 Claims. (Cl. 236—92)

This invention relates to expansion valves for refrigeration systems.

The principal object of this invention is to facilitate the removal and replacement of the operating parts of an expansion valve of either the automatic or thermostatic type in a refrigerating system, while maintaining the valve, in use, in firmly assembled leakproof relation to the remainder of the system.

Another object is to obtain in a thermostatic expansion valve the operating characteristics of a gas charged capillary system with the power and capacity of a liquid charged capillary system.

Other objects are to heat the operating chamber of a thermostatic expansion valve by bringing the incoming refrigerant into heat exchanging relation therewith so as to maintain the temperature of the operating chamber higher than the temperature of the feeler bulb at all times; and to hold liquid in the feeler bulb of the capillary system of a thermostatic expansion valve while permitting vapor to flow therefrom into the remainder of the capillary system. Another object of one form of the invention resides in the provision of an automatic spring-controlled expansion valve having the advantages described above.

Other objects and advantages will appear in the following description of preferred embodiments of this invention.

Figure 1:
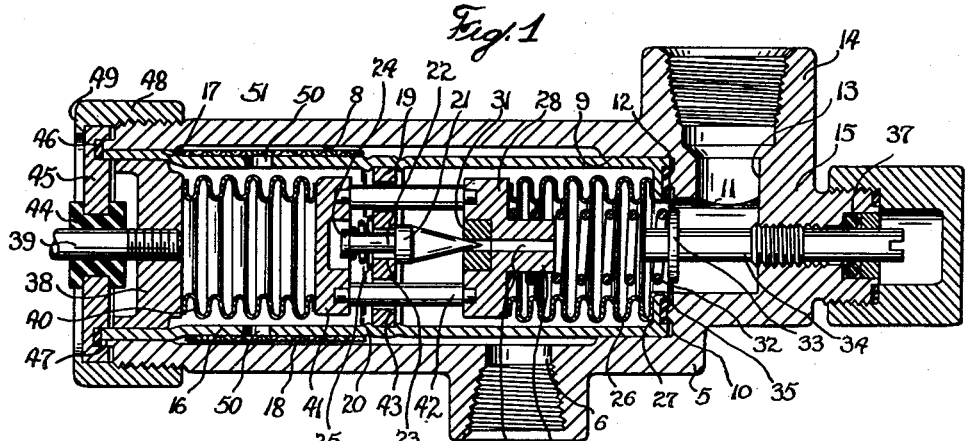
Fig. 1 is a longitudinal cross section through a thermostatic expansion valve constructed in accordance with this invention.
Figure 2:
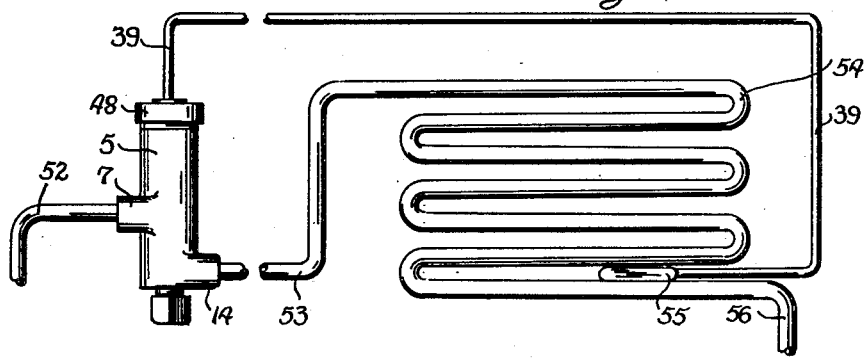
Fig. 2 is a diagram of a portion of a refrigerating system showing an installation of the valve of Fig. 1.

Referring first to the thermostatic valve shown in Figs. 1 and 2 the valve mechanism is enclosed within a cylindrical casing 5 which is designed to be installed as a permanent part of the refrigerating system. An inlet opening 6 is formed through the side of the casing and is surrounded by a pipe fitting boss 7 of any desired construction. The casing 5 is formed internally with a straight cylindrical bore 8 extending into the same from the open end terminating in a counterbore 9 of slightly smaller diameter than the bore 8. The counterbore 9 terminates in a shoulder 10 which has an axial discharge bore 11 surrounded by a raised rim 12 formed on the shoulder 10. The bore 11 communicates with an outlet opening 13 surrounded by a pipe fitting boss 14 of any suitable construction, and is closed by the end wall 15.

The operating parts of the valve are mounted within a sheet metal sleeve 16 which, through the greater part of its length, has a diameter to fit within the counterbore 9, and near its outer end has a portion 17 of slightly larger outside diameter to fit within the bore 8. Thus when the sleeve 16 is positioned in the casing 5 an annular space 18 is left between the outer surface of the sleeve 16 and the bore 8 of the casing 5, extending from the enlarged portion 17 to the counterbore 9.

Intermediate the ends of the sleeve 16 a transverse partition wall 19 is secured in position in any suitable way, as by indentations 20 formed in the sleeve 16 on opposite sides of the wall 19. A valve needle 21 is supported on the partition wall 19. Preferably the needle 21 is formed with a stem 22 passing loosely through a hole 23 in the wall 19 and terminating in a head 24. A light spring 25 engages the underside of the head 24 and the adjacent side of the wall 19 so as to hold the needle 21 normally seated against the opposite face of the wall 19, while permitting limited universal movement of the needle to insure accurate alignment with its valve seat.

An expansible bellows 26, which may be formed of thin flexible metal, has its inner end spun or otherwise secured to a flange 27 formed on the inner end of the sleeve 16. The opposite end of the bellows 26 is sealed to a valve member 28. The member 28 is formed with a short inwardly extending stem 29 and an axial bore 30 surrounded by a valve seat 31 at the outer face of the member 28. The valve seat 31 is adapted to receive the point of the needle 21 to form the expansion valve proper.

A coiled spring 32 has one end gripped around the stem 29 and engaging the adjacent face of the valve member 28, and has its opposite end extended through the aperture in the plate 27 and seated against a flange 33 formed on a rod 34 threaded through the end wall 15 of the casing 5. A resilient gasket 35 is disposed between the flange 27 on the sleeve 16 and the shoulder 10 in the casing 5, and is compressed against the raised rim 12, so that the interior of the bellows 26 is sealed at all points from the interior of the sleeve 16 and the interior of the casing 5, except through the passage 30 controlled by the needle 21.

The rod 34 extends out through the end wall 15 and is provided at its end with means to enable it to be manually adjusted to vary the tension of the spring 32. Suitable packing such as indicated at 37 is provided to seal the rod 34.

An end wall 38 is pressed into the open end of the sleeve 16 and is formed with a central aperture through which extends the capillary tube 39. A bellows 40 is sealed to the inner face of the wall 38 and its opposite end is sealed to the adjacent face of a head 41. A plurality of rods 42 extend loosely through holes 43 in the partition wall 19 and have their opposite ends secured to the head 41 and the valve member 28, so as to maintain a fixed spacing between the head 41 and the valve member 28.

The capillary tube 39 extends outwardly through a spool shaped rubber washer 44 carried in the central aperture of a closure plate 45. The plate 45 is formed with an annular groove carrying a resilient packing or the like 46 arranged to seal simultaneously against the open end of the sleeve 16 and a projecting lip 47 at the open end of the casing 5. A cap 48 is arranged to screw onto the open end of the casing 5 and is formed with a flange 49 overlying the outer face of the closure plate 45 arranged to pull the gasket 46 into sealing relation with the ends of the casing 5 and the sleeve 16, and simultaneously to force the gasket 35 into sealing relation with the shoulder 10 at the opposite end of the sleeve 16.

One or more inlet openings 50 are formed through the wall of the sleeve 16 in the zone surrounding the bellows 40. The inlet openings 50 are covered by a removable filter screen 51, which may be a sleeve surrounding the sleeve 16. Thus fluid admitted to the casing 5 through the inlet opening 6 fills the space 18 between the casing 5 and the sleeve 16 and passes through the inlet openings 50 into the interior of the sleeve 16. The fluid in the sleeve 16 surrounds all portions of the bellows 40, passes through the openings 43 of the partition wall 19 and surrounds the bellows 26. In the illustrated embodiment the bellows 40 and bellows 26 are made of the same effective area so that the pressure of the incoming fluid is balanced by the connecting rods 42 and does not tend to move the head 41 and valve member 28.

The assembly of the valve is illustrated diagrammatically in Fig. 2. A tube 52 leading from the compressor or condenser is connected to the inlet fitting 7 in the casing 5. A tube 53 is connected to the outlet fitting 14 on the casing 5 and leads to the evaporator indicated diagrammatically at 54. A feeler bulb 55 is secured in heat exchanging relation with the evaporator near the outlet end thereof and opens into the capillary tube 39 which passes into the operating chamber defined by the end wall 38, the bellows 40 and the head 41. In the preferred embodiment, the feeler bulb 55 is filled with an absorbent, such as silica gel, and the capillary system, consisting of the feller bulb 55, the tube 39 and the operating chamber within the bellows 40, is charged with a fluid which may be the same as the refrigerant used in the system. Sufficient fluid is charged into the capillary system so that some of it will be in the liquid phase at all times during normal operation while the remainder will be in the vapor phase.

In operation, liquid refrigerant from the compressor or condenser, which may be freon or methyl chloride, enters the casing 5 through the tube 52 and the inlet opening 6, passes through the openings 50 into the sleeve 16 and surrounds the bellows 26 and the bellows 40. The capillary system exerts a pressure within the bellows 40 upon the head 41 tending to move the same toward the partition wall 19 and to move the valve member 28 in the same direction so as to open the valve, this pressure varying with the temperature to which the feeler bulb 55 is subjected. The discharge end 56 of the evaporator 54 leads to the intake or suction side of the compressor so that the evaporator 54 and the space within the bellows 26 are subjected to the reduced suction pressure created by the operation of the compressor.

Assuming the compressor to be operating at a substantially constant suction pressure, the pressure exerted in the operating chamber within the bellows 40 varies with the super-heat of the refrigerant at the point of application of the feeler bulb 55. The rod 34 is adjusted so as to adjust the tension of the spring 32 and maintain the desired degree of super-heat at the point of application of the feeler bulb 55. It will be apparent that if the temperature of the bulb 55 decreases, from the admission of too much liquid through the valve passage 30, the pressure within the bellows 40 is reduced so that the spring 32 moves the valve member 28 to the left, closing the valve. If the temperature of the bulb 55 increases the resulting increased pressure in the bellows 40 moves the valve member 28 to the right, further opening the valve and permitting more liquid to enter the passage 30. When the compressor stops the increase of pressure within the bellows 26, resulting from the evaporation of liquid in the evaporator 54, moves the valve member 28 to the left, closing the valve, so that no further liquid can escape through the passage 30 into the evaporator until the compressor is again started.

By the present construction all of the operating parts of the valve are contained within a single cartridge which may be readily removed from the casing 5 without disturbing the connections between the casing and the tubes 52 and 53. This may be effected, after the pressure in the system is relieved, by simply unscrewing the cap 48 and removing the sleeve 16 endwise out of the casing 5. The end wall 45 and the spring 32 are removed with the casing 16. At the same time the feeler bulb 55 is removed from its position and this bulb and the capillary tube 39 can be taken out of the system along with the valve parts carried by the sleeve 16. A new or repaired assembly may then be installed in the system by simply slipping the sleeve 16 back into the casing 5 and positioning the feeler bulb 55 in the correct position. The removal and replacement of these parts may be done in the field by relatively unskilled service men with a minimum of effort and time and without disturbing any of the permanent or soldered joints in the system.

In the arrangement disclosed the incoming liquid refrigerant surrounds the sleeve 16 and the bellows 40 in heat exchanging relation. Since the incoming liquid refrigerant is warm relative to the temperature to which the feeler bulb 55 is exposed, the operating chamber within the bellows 40 is always maintained at a higher temperature than the feeler bulb 55. As a result the fluid in the capillary system remains in the vapor phase within the bellows 40, while a part of the fluid remains in liquid phase in the feeler bulb 55. Thus the feeler bulb is in condition to deliver the maximum power for a given change in temperature and to operate at the maximum efficiency. At the same time the operating bellows 40 remains filled with gas and operates like a gas charged power element.

This is of considerable advantage in preventing overload on the motor at the beginning of any cycle of operation of the compressor, since a liquid charged power element will positively force the valve open at a given temperature increase in the feeler bulb before the pressure in the evaporator has been reduced at the normal operating suction pressure, whereas with a gas charged power element the additional gas reaching the operating chamber as a result of increased temperature at the feeler bulb is simply compressed in the chamber until the pressure in the evaporator has been reduced to a value near the normal operating suction pressure by the compressor. This permits the motor to start the compressor and reach its normal operating speed and pressure relationship before the refrigerant starts to flow through the expansion valve. Thus by the described arrangement the advantages of both the gas filled and the liquid filled systems are realized without the disadvantages of either.

The maintenance of the liquid in the capillary system concentrated in the feeler bulb 55 is further aided by filling the feeler bulb with silica gel or similar liquid absorbent material. This material tends to prevent the liquid running out of the feeler bulb into the capillary tube, particularly in the periods between operations of the compressor, so that an ample quantity of liquid in the feeler bulb is assured at all times.

Figure 3:
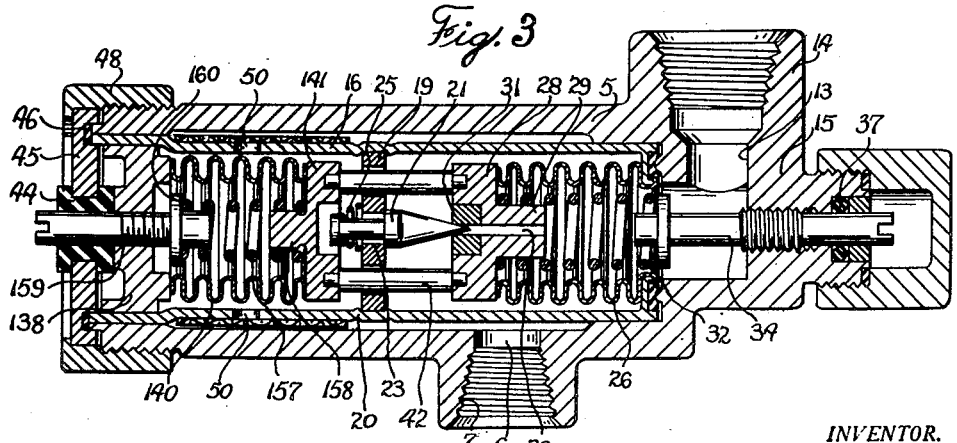
Fig. 3 is a longitudinal section through an automatic expansion valve embodying this invention.

An automatic expansion valve embodying certain of the features of this invention is illustrated in Fig. 3. In this type of valve a spring is substituted for the power element operated by the feeler bulb. As shown in Fig. 3, the same casing 5 is used for the automatic valve. The sleeve 16 with the partition wall 19 carrying the valve needle 21, and the assembly of the valve member 28, bellows 26, spring 32 and spring adjusting rod 34, are identical with the corresponding elements shown and described in connection with Figs. 1 and 2. The bellows 140 connected to the head 141 encloses a valve operating spring 157. The head 141 is formed with a stem 158 which is gripped within the adjacent convolutions of the spring 157. The end closure plate 138 has a spring adjusting rod 159 screwed into it instead of the capillary tube 39 which enters the end closure 38. The adjusting rod 159 fits within the adjacent convolutions of the spring 157 and is provided with a flange 160 engaging the end convolution of the spring. The remaining parts are identical with the corresponding parts shown in Fig. 1.

In operation the liquid refrigerant from the condenser or compressor enters the casing 5 through the inlet opening 6, passes through the opening 50 into the interior of the sleeve 16 and surrounds the bellows 140 and 26. The valve member 28 carrying the seat 31 is urged away from the needle 21 to open the passage 30 by the tension of the spring 157, and is urged toward closed position by the tension of the spring 32 and the fluid pressure existing within the bellows 26. The pressure within the bellows 26 is a function of the suction pressure of the compressor as modified by the liquid escaping into and evaporating in the evaporator. When too much liquid enters the evaporator the pressure in the bellows 26 rises, moving the valve member 28 toward closed position, and when insufficient liquid enters the evaporator for the conditions of load being encountered the pressure in the bellows 26 falls so that the spring 157 moves the valve member 28 toward open position.

As in the embodiment previously described, all of the operating parts of the valve may be readily removed by simply unscrewing the cap 48 and removing the end plate 45 and the sleeve 16, carrying with it all the operating parts of the valve, through the open end of the casing 5. The removal and replacement of the valve cartridge is an extremely simple task which does not require a high degree of skill and consumes but a few moments of time. At the same time the valve casing 5 remains securely fixed in position with respect to the remainder of the system, and when the cap 48 is screwed down the valve cartridge is firmly secured in position in leak proof relation to the inlet and outlet openings in the casing.

Although preferred embodiments of the invention have been described in considerable detail it will be understood that many modifications and rearrangements of the parts may be resorted to without departing from the scope of the invention as defined in the following claims.

I claim:

1. A thermostatic expansion valve including housing means, a bellows within said housing means and sealed from the interior thereof, a baffle in said housing means and forming therewith a first chamber for said bellows and a second chamber, an aperture in said baffle, valve operator means connected to said bellows and extending through said baffle aperture, male and female valve members in said second chamber, one of said valve members being connected to said valve operating means and the other being mounted in said second chamber, a fluid outlet leading from said female valve member, said bellows and valve members being arranged so that when expanded the bellows moves said valve to open position, a tube communicating with the interior of said bellows and having an end adapted to be positioned in heat exchanging relation with a member whose temperature is to be controlled, said tube and the interior of said bellows being charged with a fluid with a pressure such that part of said fluid is in liquid phase and part in vapor phase during normal operation of said valve, a fluid inlet means in said housing means leading to said first chamber, fluid passageway means between said chambers, whereby incoming fluid bathes said bellows in said first chamber and thence flows through said passageway means to the second chamber, through said female valve member and out said fluid outlet.

2. A thermostatic expansion valve including housing means, a first bellows within said housing means and sealed from the interior thereof, a baffle in said housing means and forming therewith a first chamber for said first bellows and a second chamber, an aperture in said baffle, valve operator means connected to said first bellows and extending through said baffle aperture, male and female valve members in said second chamber, said female valve member being connected to said valve operating means and said male valve member being mounted in said second chamber, a second bellows in said second chamber and connected to said female valve member, a fluid outlet leading from said second bellows, said first bellows and associated valve member being arranged so that when expanded the first bellows moves said valve to open position, a tube communicating with the interior of said first bellows and having an end adapted to be positioned in heat exchanging relation with a member whose temperature is to be controlled, said tube and the interior of said bellows being charged with a fluid with a pressure such that part of said fluid is in liquid phase and part in vapor phase during normal operation of said valve, a fluid inlet means in said housing means leading to said first chamber, fluid passageway means between said chambers, whereby incoming fluid bathes said first bellows in said first chamber and thence flows through said passageway means to the second chamber, through said female valve member and out said fluid outlet.

3. A thermostatic expansion valve including a casing open at one end and formed with a wall at the other end having an outlet, a sleeve having walls at each end thereof slidable into said casing, a bellows mounted on one wall of said sleeve and sealed from the interior thereof, a baffle in said sleeve and forming therewith a first chamber for said bellows and a second chamber, an aperture in said baffle, valve operator means connected to said bellows and extending through said baffle aperture, male and female valve members in said second chamber, one of said valve members being connected to said valve operating means and the other being mounted in said second chamber, a fluid conducting means leading from said female valve member through the other wall of said sleeve, said bellows and valve members being arranged so that when expanded the bellows moves said valve to open position, a fluid inlet in said casing external of said sleeve, a fluid inlet in said sleeve leading to said first chamber, fluid passageway means within said casing and between said chambers, and means to close the open end of said casing and retain said sleeve therein with the outlet of said sleeve sealed with the outlet of said casing wall.

4. A thermostatic expansion valve including a casing open at one end and formed with a wall at the other end having an outlet, a sleeve having walls at each end thereof slidable into said casing, a bellows mounted on one wall of said sleeve and sealed from the interior thereof, a baffle in said sleeve and forming therewith a first chamber for said bellows and a second chamber, an aperture in said baffle, valve operator means connected to said bellows and extending through said baffle aperture, male and female valve members in said second chamber, one of said valve members being connected to said valve operating means and the other being mounted in said second chamber, a fluid conducting means leading from said female valve member through the other wall of said sleeve, said bellows and valve members being arranged so that when expanded the bellows moves said valve to open position, a tube communicating with the interior of said bellows and having an end adapted to be positioned in heat exchanging relation with a member whose temperature is to be controlled, said tube and the interior of said bellows being charged with a fluid with a pressure such that part of said fluid is in liquid phase and part in vapor phase during normal operation of said valve, a fluid inlet in said casing external of said sleeve, a fluid inlet in said sleeve leading to said first chamber, fluid passageway means within said casing and between said chambers, and means to close the open end of said casing and retain said sleeve therein with the outlet of said sleeve sealed with the outlet of said casing wall, whereby incoming fluid bathes said bellows in said first chamber and thence flows through said passageway means to the second chamber, through said female valve member and out said fluid outlet.

5. A thermostatic expansion valve including a casing open at one end and formed with a wall at the other end having an outlet, a sleeve having walls at each end thereof slidable into said casing, a first bellows mounted on one wall of said sleeve and sealed from the interior thereof, a baffle in said sleeve and forming therewith a first chamber for said first bellows and a second chamber, an aperture in said baffle, valve operator means connected to said first bellows and extending through said baffle aperture, male and female valve members in said second chamber, a second bellows in said second chamber, one end of said second bellows being mounted on the other wall of said sleeve, said female valve member being mounted on the other end of said second bellows, said other end of said second bellows being connected to said valve operating means, the other valve member being fixed in said second chamber, a fluid conducting port through the other wall of said sleeve and communicating with said second bellows, said first bellows and valve members being arranged so that when expanded the bellows moves said valve to open position, a fluid inlet in said casing external of said sleeve, a fluid inlet in said sleeve leading to said first chamber, fluid passageway means within said casing and between said chambers, and means to close the open end of said casing and retain said sleeve therein with the outlet of said sleeve sealed with the outlet of said casing wall.

6. A thermostatic expansion valve including a casing open at one end and formed with a wall at the other end having an outlet, a sleeve having walls at each end thereof slidable into said casing, a first bellows mounted on one wall of said sleeve and sealed from the interior thereof, a baffle in said sleeve and forming therewith a first chamber for said first bellows and a second chamber, an aperture in said baffle, valve operator means connected to said first bellows and extending through said baffle aperture, male and female valve members in said second chamber, a second bellows in said second chamber, one end of said second bellows being mounted on the other wall of said sleeve, said female valve member being mounted on the other end of said second bellows, said other end of said second bellows being connected to said valve operating means, the other valve member being fixed in said second chamber, a fluid conducting port through the other wall of said sleeve and communicating with said second bellows, said first bellows and valve members being arranged so that when expanded the bellows moves said valve to open position, a tube communicating with the interior of said first bellows and having an end adapted to be positioned in heat exchanging relation with a member whose temperature is to be controlled, said tube and the interior of said bellows being charged with a fluid with a pressure such that part of said fluid is in liquid phase and part in vapor phase during normal operation of said valve, a fluid inlet in said casing external of said sleeve, a fluid inlet in said sleeve leading to said first chamber, fluid passageway means within said casing and between said chambers, and means to close the open end of said casing and retain said sleeve therein with the outlet of said sleeve sealed with the outlet of said casing wall, whereby incoming fluid bathes said bellows in said first chamber and thence flows through said passageway means to the second chamber, through said female valve member and out said fluid outlet.

GEORGE O. R. LINDGREN.

REFERENCES CITED

The following references are of record in the file of this patent:

UNITED STATES PATENTS

| Number | Name | Date |
|---|---|---|
| 926,024 | Schroeder | June 22, 1909 |
| 1,066,350 | Watrons | July 1, 1913 |
| 1,847,911 | Trane | Mar. 1, 1932 |
| 2,021,727 | Hillen et al. | Nov. 19, 1935 |
| 2,096,094 | Dube | Oct. 19, 1937 |
| 2,116,802 | Shivers | May 10, 1938 |
| 2,221,633 | Dasher | Nov. 12, 1940 |
| 2,279,002 | MacNeil | Apr. 7, 1942 |
| 2,312,251 | Johnson | Feb. 23, 1943 |
| 2,318,721 | Siver | May 11, 1943 |
| 2,357,795 | Dillman et al. | Sept. 12, 1944 |